United States Patent Office 3,489,599
Patented Jan. 13, 1970

3,489,599
INTERFITTING PARTS WITH NONTACKY COATING OF ANAEROBICALLY POLYMERIZABLE LIQUID COMPOSITION
Vernon K. Krieble, deceased, late of Hartford, Conn., by Robert H. Krieble, executor, West Hartford, Conn., assignor to Loctite Corporation, Newington, Conn., a corporation of Connecticut
No Drawing. Filed May 18, 1966, Ser. No. 551,854
Int. Cl. B44d 1/36, 5/00
U.S. Cl. 117—132    22 Claims

ABSTRACT OF THE DISCLOSURE

Mating and interfitting parts (e.g., nuts and bolts or slip-fitted tubing) can be coated with an oxygen stabilized mixture of a polymerizable acrylate monomer and a peroxidic polymerization initiator. The mixture then can be covered with an oxygen permeable envelope and will not polymerize as long as it remains in contact with oxygen passing through the envelope. When the parts are assembled, oxygen is excluded and polymerization will take place, thus providing enhanced engagement between the parts.

---

The present invention relates to coatings for producing enhanced engagement between mating surfaces of interfitting parts, and more particularly to interfitting parts having a nontacky coating including an anaerobically polymerizable liquid composition for effecting enhanced engagement between the mating surfaces of the coated part and a cooperating element.

In U.S. Patent No. 2,895,950, issued July 21, 1959, there is disclosed a liquid composition in which will anaerobically polymerize a monomer having the following general formula:

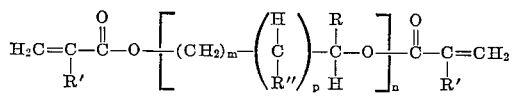

wherein R is a member selected from the class consisting of hydrogen, —CH$_3$, —C$_2$H$_5$, —CH$_2$OH, and

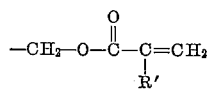

radicals; R' is a member selected from the class consisting of hydrogen, chlorine, and methyl and ethyl radicals; R" is a member selected from the class consisting of hydrogen, —OH radical, and

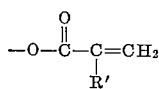

radical; m is an integer equal to at least 1, e.g. from 1 to 8 or higher, for instance, from 1 to 4, inclusive; n is an integer equal to at least 2, for example, from 2 to 20 or more; and p is one of the following: 0, 1.

In this patent, it is disclosed that such monomers will polymerize rapidly to the solid state in the presence of certain organic hydroperoxide catalyst upon the exclusion of air or oxygen from the composition. However, such compositions will remain in the liquid state so long as contact with air or oxygen is maintained, thus enabling the sealing of metal parts by placement of the liquid coating upon one or both surfaces of the interfitting parts prior to assembly thereof or by utilizing capillary or wicking action to cause the liquid composition to penetrate between the adjacent surfaces of assembled parts. As soon as air is excluded from the composition, polymerization occurs rapidly and spontaneously so as to form a strong bond between the adjacent surfaces.

In U.S. Patent No. 3,041,322, granted June 26, 1962, such an anaerobically polymerizable composition is disclosed using a triorganoamine and tertiary butyl hydroperoxide in combination. In U.S. Patent No. 3,043,820, granted July 10, 1962, there is disclosed and claimed the use of quinones to provide extended shelf stability to a composition of the above general formula in the presence of oxygen. In U.S. Patent No. 3,046,262, granted July 24, 1962, it is disclosed that compositions of the foregoing type may be accelerated in their polymerization by the inclusion of imide accelerators, and in U.S. Patent No. 3,203,941, granted Aug. 31, 1965, there is disclosed the accelerating effect of certain polyamino compounds. In U.S. Patent No. 3,218,305, granted Nov. 16, 1965, the acceleration of such polymerization reactions by use of heterocyclic secondary amines, N,N-dialkyl arylamines and N,N-dialkyl substituted arylamines is proposed.

The foregoing formulations have enjoyed substantial commercial success and acceptance by reason of the very great advantage in providing enhanced engagement between interfitting parts quickly and at room temperature. The compositions are readily applied to one or both of the mating surfaces by dipping, spraying, tumbling or any other suitable means, and the parts may be precoated well in advance of assembly.

Since the compositions of the aforementioned patents are all liquids, handling of parts coated therewith sometimes presents problems due to the oily nature of the coating. In addition, the storage of a volume of parts having irregular surfaces which are precoated with the composition may sometimes present problems due to the fact that portions of the surfaces of adjacent parts may so mate with each other as to exclude air and tend to produce polymerization of the coating in the area of close proximity. In addition, there is a tendency for the liquid coating to spread along the mating surfaces over a greater area than that in which the polymerized composition might be desired.

It is an object of the present invention to provide a part having a non-oily and nontacky coating thereon including a liquid composition which will rapidly polymerize upon the exclusion of oxygen when interfitted with a cooperating part so as to produce firm engagement therebetween.

Another object is to provide a method for producing non-oily and nontacky coatings of such liquid compositions upon mating parts which is rapid, economical and adaptable to variation.

It is also an object to provide such a coated part which will exhibit extended shelf life in the presence of oxygen and which will release the liquid to polymerize rapidly between the cooperating parts upon assembly thereof.

Other objects and advantages will be readily apparent from the following detailed specification and the attached claims.

It has now been found that the foregoing and related objects can be readily attained by use of a part for assembly with a cooperating part to enter into sealed engagement therewith wherein the part has a nontacky coating on at least one portion of the surface thereof to be mated with the cooperating part which is actuatable upon assembly of the parts to provide enhanced engagement between the mating surfaces thereof. The coating of the present invention includes a liquid composition which is anaerobically polymerizable to a solid, tough synthetic polymer upon the exclusion of oxygen and an envelope of oxygen-permeable material which contains the anaerobically polymerizable liquid composition. The envelope provides a substantially non-oily and non-tacky outer surface for the coating and is rupturable upon assembly of the metal part with its cooperating part to release the liquid composition for flow between the mating surfaces so that it will polymerize therebetween to effect the desired sealing engagement.

A portion of the enhanced engagement generally is provided by actual adhesive bonding between the surfaces. However, because of the interfitting nature of the parts, the mere presence of the cured polymer between the mating surfaces provides resistance to disassembly and, hence, enhanced engagement even in the absence of adhesive bonding.

The anaerobically polymerizable liquid compositions contemplated by the present invention utilize a polyacrylate monomer corresponding to the following general formula:

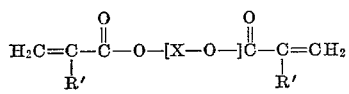

wherein R' is a member selected from the class consisting of hydrogen, halogen and a lower alkyl group of 1 to 4 carbon atoms, and wherein X is a chain containing at least 2 carbon atoms and containing no groups which would tend to polymerize other than additional acrylate groups. In addition, hydroperoxide catalysts are included therein which have the effect of producing polymerization of the monomer upon exclusion of air but which are characterized by inability to polymerize the monomer in the presence of oxygen as will be pointed out more fully hereinafter. In addition, the compositions desirably contain stabilizers such as the quinones referred to in the aforementioned U.S. Patent No. 3,043,820 and various accelerators may also be included such as those referred to in the aforementioned U.S. Patents No. 2,895,950, No. 3,046,262 and No. 3,218,305.

The oxygen-permeable envelope about the liquid composition may be formed in situ after the liquid composition has been applied to the surface of the mating part, or it may be formed about relatively small globules of the liquid composition to form capsules which are then applied to the mating surface of the part, as will be pointed out in more detail hereinafter. The parts may be threaded fasteners wherein the threaded surfaces enter into the desired mating contact, a part providing an aperture for receiving a second part in a male-female relationship, or any other form wherein the parts will interfit sufficiently closely so that air is excluded from at least a portion of the mating surfaces containing the coating.

THE MONOMER

As indicated previously, the monomer is a polyfunctional acrylate compound wherein the intervening chain contains at least two carbon atoms and contains no groups which would tend to polymerize other than additional acrylate groups. Thus, polymerization of the monomer occurs through the action of the acrylate groups of the molecule only.

In accordance with the most common aspect of the present invention, the group [X—O—] corresponds to the following formula:

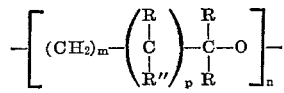

wherein R represents a radical selected from the group consisting of hydrogen, lower alkyls of one to four carbon atoms inclusive, hydroxyalkyls of one to four carbon atoms inclusive, and

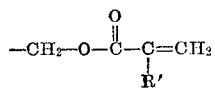

R" is a radical selected from the group consisting of hydrogen, OH,

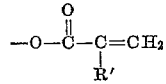

wherein R' is as defined previously; $m$ is an integer equal to at least 1, i.e. from 1 to 8 or higher, for instance from 1 to 4 inclusive; $p$ is one of the following: 0, 1; and $n$ is an integer equal to at least 1, for example 1 to 20 or more.

Exemplary of such polymerizable polyacrylate esters corresponding to the above general formula are diethylene glycol dimethacrylate, triethylene glycol dimethacrylate, tetraethylene glycol dimethacrylate, dipropylene glycol dimethacrylate, polyethylene glycol dimethacrylate, di-(pentamethylene glycol) dimethacrylate, tetraethylene glycol diacrylate, tetraethylene glycol di-(chloroacrylate), diglycerol diacrylate, diglycerol tetramethacrylate, tetramethylene dimethacrylate, ethylene dimethacrylate, neopentyl glycol diacrylate and trimethylol propane triacrylate. The foregoing monomers need not be in the pure state but may comprise commercial grades in which inhibitors or stabilizers are included.

However, in addition to the more commonly employed polyacrylates specifically described above, it is possible to employ carbon chains as the group X in the monomer which are low polymers modifying the properties of the monomer so long as they contain no polymerizable group other than additional acrylate groups. Exemplary of such materials are polyurethanes, polyureids or polyesters. As specific examples thereof, X may have the form:

Cured Isocyanate (urethane)

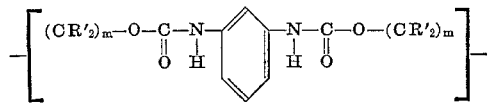

Cured Epoxy

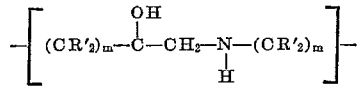

Ester

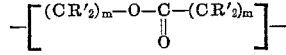

wherein R' and $m$ have the meanings hereinbefore indicated.

As will be appreciated, it is also possible to obtain modified characteristics for the polymerized composition by the inclusion of minor amounts of other unsaturated monomers such as unsaturated hydrocarbons or unsaturated esters which will polymerize during the anaerobic polymerization of the monomers of the present invention.

As used herein, the term "polymerizable polyacrylate ester" includes not only the foregoing polyacrylate monomers in the pure and impure state but also those other compositions which contain those polyacrylate monomers in amounts sufficient to impart ot the compositions the characteristic of being anaerobically polymerizable.

THE CATALYSTS

In the aforementioned U.S. Patent No. 2,895,950, the catalysts specifically disclosed are certain non-polymerizing organic hydroperoxides which are characterized by the fact that the atoms directly linked to the carbon atom bearing the hydroperoxide radical are selected from the group consisting of carbon, hydrogen, nitrogen or oxygen, and, in such cases where all of the said directly linked atoms are carbon, not more than two of said carbon atoms comprise the carbon atom of a methyl group. Some of these hydroperoxide catalysts may be produced readily by direct substitution, and others are produced by oxygenation of compounds in the liquid phase, particularly by passing oxygen or an oxygen-containing gas through the compounds, preferably ethers, ketones and hydrocarbons, The mixture of these catalysts with the monomer is highly sensitive to contact with air so that the catalyst remains inactive or ineffective in the presence of oxygen, but upon exclusion therefrom will initiate polymerization of the monomer. Further details concerning the preparation and specific examples of such hydroperoxide catalysts can be readily obtained from the specification of the aforementioned patent.

In addition to the organic hydroperoxide catalysts specifically defined in that patent, others of the aforementioned patents indicate that such compositions may employ as catalysts hydrogen peroxide, tert-butyl hydroperoxide and organic peroxides and peresters which are hydrolyzable or decomposable to an organic hydroperoxide which imparts to the anaerobically polymerizable composition the characteristic of stability in the presence of air at ambient temperatures for extended periods of time. Exemplary of such materials which will form organic hydroperoxides are alpha-hydroxyperoxides which decompose to hydroperoxides and peresters which will rapidly hydrolyze to hydroperoxides, thus forming hydroperoxides in situ. All of such organic hydroperoxides and compounds which will decompose or hydrolyze to an organic hydroperoxide as well as hydrogen peroxide are referred to hereinafter as "hydroperoxide catalyst."

However, the preferred catalysts are the organic hydroperoxides of the aforementioned U.S. Patent No. 2,895,950 such as cumene hydroperoxide, methyl ethyl ketone hydroperoxide, and hydroperoxides formed by oxygenation in the liquid phase of compounds such as cyclohexene, methyl n-hexyl ketone, isopropyl ketone, diethylene glycol and propylene glycol.

The amount of catalyst will vary depending upon its degree of oxygenation, the presence of accelerators, and the conditions of polymerization. Generally, the catalyst will range from 0.1 to 20.0 percent by weight and preferably about 1.0 to 10.0 percent by weight.

ACCELERATORS

As pointed out previously, various compounds may be included within the compositions to accelerate the polymerization thereof. As pointed out in U.S. Patent No. 2,895,950, organic amines such as tertiary amines, organic phosphites, organic mercaptans, ascorbic acid, quaternary ammonium salts and the like are effective in this regard. In U.S. Patent No. 3,046,262, organic sulfimides and formamide are proposed. As pointed out in U.S. Patent No. 3,218,305, other accelerators are heterocyclic secondary amines wherein the heterocyclic ring is hydrogenated, N,N-dialkyl arylamines and N,N-dialkyl substituted arylamines wherein the substituents are selected from the group consisting of lower alkyl radicals of one to four carbon atoms with the number of the substituents being at least two when one of the substituents is in the ortho position.

Generally, such accelerators may be provided in as little as trace amounts and up to saturation, depending upon the accelerator selected, the stabilizer and the monomer, as is more amply pointed out in the aforementioned patents. Usually, however, the accelerator is included in amounts of 0.05 to 10.0 percent by weight, and preferably 0.1 to 2.0 percent by weight.

STABILIZERS

As pointed out in U.S. Patent No. 3,043,820, the anaerobically polymerizable polyacrylate monomer compositions desirably include quinones in minor amounts sufficient to provide the desired degree of shelf stability. Generally, benzoquinones and naphthaquinones have been found effective in amounts of as little as 10 parts per million and have been used in quantities as great as 1000 parts per million of the basic formulation. Normally, the quinone is employed in the range of 25 to 500 parts per million, and preferably 50 to 250 parts per million. The amount required will be somewhat dependent upon the nature of the monomer, including possible impurities therein, the catalyst and the accelerator.

In U.S. Patent No. 3,218,305, sterically hindered monohydric and polyhydric phenols are also utilized as stabilizers. The groups for effecting the steric hindrance are generally alkyl groups of at least two carbon atoms, such as tertiary-butyl or isopropyl groups, and are usually located in the ortho position to the hydroxyl group of the phenol.

COATING

As previously indicated, the coating may be developed in situ upon the part by first applying the liquid polymerizable composition to the surface thereof and then forming the envelope of oxygen-permeable material thereover so that the resultant coating is substantially non-tacky and non-oily. Although a separated material, such as gelatin and a mixture of gelatin and algin, may be applied to the surface of the liquid polymerizable composition by spraying, dipping, brushing and the like to produce the non-tacky coating, it has been found that the envelope may be generated in situ from the liquid polymerizable composition itself by exposing the composition to an environment which will produce a thin skin of polymerized monomer sufficient to constitute the envelope and which is permeable to oxygen but not to the monomer. Sulfur dioxide, hydrogen sulfide and nitrogen dioxide have all been found satisfactory for this purpose with the preferred agent being sulfur dioxide or aqueous solutions thereof; i.e., sulfurous acid. Generally, it is believed that these materials are capable of producing transfer of one electron in acting upon the hydroperoxide catalyst to produce instantaneous localized free radicals and resultant localized polymerization of the monomer at the exposed surface.

More recently, it has been proposed to encapsulate the polymerizable formulation in an oxygen-permeable skin with the capsules taking the form of spheres of about 50 to 2000 microns, and preferably about 200 to 1000 microns. These capsules may be generated by exposing droplets of the liquid composition to an environment which will form the air-permeable skin therefrom as hereinbefore indicated; i.e., sulfur dioxide and the like. Alternatively, encapsulating procedures using a medium for the envelope which is oxygen-permeable but impermeable to the liquid composition may be employed such as gelatin and mixtures of gelatin and algin. The envelope should be relatively thin so that the liquid composition available for polymerization comprises at least about 60.0 percent by volume of the capsule, and preferably more than 80.0 percent by weight. The envelope should be a non-lubricant and should be readily rupturable upon interfitting. Procedures for forming such microcapsules with a separate medium are set forth in U.S. Patent No. 2,800,458, granted July 23, 1957 (Reissue Patent No. 24,899, dated Nov. 29, 1960), and U.S. Patent No. 3,015,128, granted Jan. 2, 1962. The resultant capsules of the formulation may then be secured to the surface of the part by any suitable means such as solvent adhesion, a separate coating of adhesive, electrostatic attraction, etc.

By proper selection of the envelope for the particular monomer formulation, the surface of the coating may be developed as substantially non-tacky and non-oily. Moreover, the polymerizable formulation is retained in the desired location upon the surface of the part. The coated part and its mating element (and/or the thickness of the coating) are dimensioned so that when the parts are interfitted, the movement of the surfaces will crush or otherwise break open the envelope about the liquid composition and cause it to flow between the mating surfaces to provide enhanced engagement therebetween upon polymerization.

Since the composition will polymerize upon the exclusion of air, the parts should interfit sufficiently closely so that air will be excluded over the major portion of the coated surface either by the configuration of the parts per se or their being pressed closely together or by the combination of the assembly thereof with the coating.

Illustrative of the efficacy of the present invention are the following specific examples.

EXAMPLE ONE

To the threads of nuts having an inside diameter of ⅜ inch was applied 0.04 cc. of a liquid, anaerobically polymerizable composition containing tetraethylene glycol dimethacrylate, 7.0 percent by weight cumene hydroperoxide and 2.0 percent by weight of triethylamine, as well as a minor amount of quinone. The nuts were dipped into an atmosphere of sulfur dioxide to produce a thin, polymerized skin upon the surface of the polymerizable composition. The resultant coating was one which was non-tacky and non-oily.

The coated nuts were then stored at ambient temperature in the presence of oxygen for thirty days. No visible change in the coating was noted, and the area of the coating remained constant, indicating that the liquid formulation did not penetrate through the envelope or creep along the surface of the threads. The nuts were observed to be dry and shiny.

The nuts were then assembled with cap screws by finger pressure. After eighteen hours at ambient temperature, the prevailing torque required for disassembly was found to be 4 foot pounds, indicating that the envelope had been ruptured and that the liquid composition had polymerized to provide enhanced engagement between the mating surfaces.

EXAMPLE TWO

The polymerizable liquid composition of Example One was placed upon the threads of additional nuts in the manner indicated in Example One. Groups of these nuts were then exposed to fumes of hydrogen chloride, nitrogen dioxide, selenium dioxide and sulfonyl chloride. It was found that nitrogen dioxide and selenium oxide and hydrogen chloride produced localized polymerization of the composition so as to form an envelope thereover similar to that produced by the sulfur dioxide in the previous example, although not so satisfactory. The sulfonyl chloride produced complete polymerization of the coating of the liquid composition rather than just a skin or envelope so that it was found to be unsatisfactory.

EXAMPLE THREE

A sealant composition similar to that in Example One was injected into a saturated aqueous solution of sulfur dioxide ($H_2SO_3$) by means of a pipette having its tip slightly below the surface of the solution while the solution was being rapidly agitated. Droplets of the liquid composition were formed at the end of the pipette and rapidly swirled away therefrom to form tiny capsules of the liquid composition having a skin or envelope of the polymerized composition thereabout. The capsules were then recovered from the solution and found to vary in diameter from about 300 to about 500 microns.

The capsules were applied to the threads of ⅜ inch cap screws which were then finger tightened with nuts and allowed to stand overnight. Upon testing in the morning, it was found that the prevailing torque required for disassembly was 8 foot pounds indicating that the capsules had been ruptured and that the liquid composition had polymerized to provide enhanced engagement between the mating threads.

EXAMPLE FOUR

Microcapsules of the liquid composition were prepared by a procedure of the type described in the aforementioned U.S. Patent No. 3,015,128 wherein a spinning disc is employed. The encapsulating medium was a mixture of 77.0 percent by weight gelatin (50 bloom) and 23.0 percent by weight glycerol. The liquid composition comprised about 80.0 percent by weight of the capsules which had an average diameter of about 150 microns.

The capsules were placed on the threads of ⅜ inch diameter cap screws and nuts were finger tightened thereon. After storage overnight at ambient temperature, the prevailing torque was found to be 10 foot pounds.

Thus, it can be seen from the foregoing specification and examples that the present invention provides a highly effective and versatile method of manufacturing parts with a non-oily and non-tacky coating thereon containing a liquid composition which will rapidly polymerize upon the exclusion of oxygen upon interfitting thereof with a cooperating part so as to produce enhanced engagement therebetween. In this manner, such liquid compositions which have a tendency to spread over the surface of the part of which would tend to polymerize if excluded from air by unintended close interfitting of coated parts stored together can be utilized conveniently. As a result, it is now possible to precoat elements well in advance of need without undue loss in effectiveness of the composition and in a manner so as to control the location of the composition. However, when assembled, the coated part rapidly releases the polymerizable formulation so that it flows into contact with the surfaces of the interfitting parts and polymerizes to provide enhanced engagement therebetween.

Having thus described the invention, what is claimed is:

1. A part for assembly with a cooperating part to enter into sealed engagement therewith and substantially exclude oxygen from at least a portion of the engaged area, said part having a coating on at least a portion of the surface thereof to be mated with the cooperating part which is actuatable upon assembly of the parts to provide enhanced engagement between the mating surfaces thereof, said coating including: (a) a liquid composition anaerobically polymerizable to a solid, tough synthetic polymer upon the exclusion of oxygen; and (b) an envelope of an oxygen-permeable material containing said anaerobically polymerizable liquid composition and providing a substantially nontacky outer surface for said coating; said envelope being rupturable upon assembly of said part with a cooperating part to release said liquid composition for flow between the mating surfaces to provide enhanced engagement therebetween upon polymerization.

2. The part of claim 1 wherein the coating of liquid composition in the envelope of oxygen-permeable material is in the form of capsules of said liquid composition in oxygen-permeable skins, said capsules being from about 50 to about 2,000 microns in size.

3. The part of claim 1 wherein said anaerobically polymerizable composition consists essentially of a hydroperoxide catalyst and a polymerizable polyacrylate ester having the following general formula:

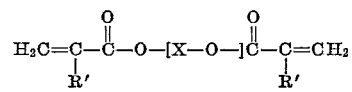

wherein R' is a member selected from the class consisting of hydrogen, halogen and lower alkyl groups of one to four carbon atoms; and wherein X is a chain containing at least two carbon atoms and containing no groups which would tend to polymerize other than acrylate groups.

4. The part of claim 3 wherein [X—O—] corresponds to the following general formula:

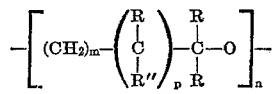

wherein R represents a radical selected from the group consisting of hydrogen, lower alkyls of one to four carbon atoms inclusive, hydroxyalkyls of one to four carbon atoms inclusive and

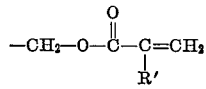

R" is a radical selected from the group consisting of hydrogen, —OH and

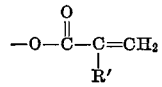

$m$ is an integer equal to at least 1; $p$ is one of the following: 0, 1; and $n$ is an integer equal to at least 1.

5. The part of claim 3 wherein said hydroperoxide catalyst is an organic hydroperoxide.

6. The part of claim 3 wherein said composition additionally contains an agent which accelerates the polymerization thereof.

7. The part of claim 3 wherein said envelope is produced by exposing the anaerobically polymerizable composition to an activating material which produces localized polymerization at the surface of said composition to form a skin therefrom.

8. The part of claim 7 wherein said activating material is sulfur dioxide.

9. A part for assembly with a cooperating part to enter into sealed engagement therewith and substantially exclude oxygen from at least a portion of the engaged area, said part having a coating on at least a portion of the surface thereof to be mated with the cooperating part which is actuatable upon assembly of the parts to provide enhanced engagement between the mating surfaces thereof, said coating including: (a) a liquid composition anaerobically polymerizable to a solid, tough synthetic polymer upon the exclusion of oxygen; and (b) an envelope of an oxygen-permeable material containing said anaerobically polymerizable liquid composition and providing a substantially nontacky outer surface for said coating; said liquid composition forming a layer in contact with the surface of said part and said envelope extending about the outer surface of said layer, said envelope being rupturable upon assembly of said part with a cooperating part to release said liquid composition for flow between the mating surfaces to provide enhanced engagement therebetween upon polymerization, said liquid composition consisting essentially of a hydroperoxide catalyst and a polymerizable polyacrylate ester having the following general formula:

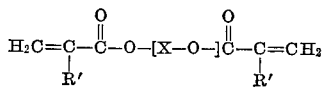

wherein R' is a member selected from the class consisting of hydrogen, halogen and lower alkyl groups of one to four carbon atoms; and wherein X is a chain containing at least two carbon atoms and containing no groups which would tend to polymerize other than acrylate groups.

10. The part of claim 9 wherein [X—O—] corresponds to the following general formula:

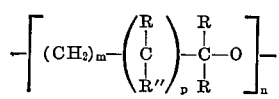

wherein R represents a radical selected from the group consisting of hydrogen, lower alkyls of one to four carbon atoms, inclusive, hydroxyalkyls of one to four carbon atoms inclusive and

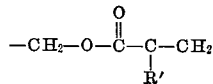

R" is a radical selected from the group consisting of hydrogen, —OH and

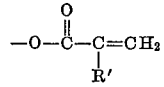

$m$ is an integer equal to at least 1; $p$ is one of the following: 0, 1; and $n$ is an integer equal to at least 1.

11. The part of claim 9 wherein said envelope is produced by exposing said liquid composition to an activating material which produces localized polymerization at the surface of said composition to form a skin therefrom.

12. In the method of producing engagement between the mating surfaces of cooperating parts, the steps comprising: forming a coating upon a portion of the surface of a first part to be engaged, said coating including: (a) a liquid composition anaerobically polymerizable to a solid, tough synthetic polymer upon the exclusion of oxygen; and (b) an envelope of an oxygen-permeable material containing said anaerobically polymerizable liquid composition and providing a substantially non-tacky outer surface for said coating, said envelope being rupturable upon assembly of said part; assembling said first part with a cooperating part to substantially exclude air from between the mating surfaces thereof having said coating and to rupture said envelope to release said liquid composition for flow between said mating surfaces; and allowing said assembled parts to remain in assembly for a period of time sufficient for said liquid composition to polymerize anaerobically.

13. The method of claim 12 wherein the coating of liquid composition in the envelope of oxygen-permeable material is in the form of capsules of said liquid composition in oxygen-permeable skins, said capsules being from about 50 to about 2,000 microns in size.

14. The method of claim 12 wherein said hydroperoxide catalyst is an organic hydroperoxide.

15. The method of claim 12 wherein said envelope is produced by exposing the anaerobically polymerizable composition to an activating material which produces localized polymerization at the surface of said composition to form a skin therefrom.

16. The method of claim 12 wherein said anaerobically polymerizable composition consists essentially of a hydroperoxide catalyst and a polymerizable polyacrylate ester having the following general formula:

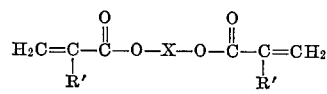

wherein R' is a member selected from the class consisting of hydrogen, halogen and lower alkyl groups of one to four carbon atoms; and wherein X is a chain containing at least two carbon atoms and containing no groups which would tend to polymerize other than acrylate groups.

17. The method of claim 16 wherein X corresponds to the following general formula:

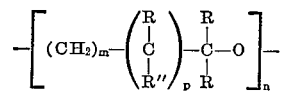

wherein R represents a radical selected from the group consisting of hydrogen, lower alkyls of one to four carbon atoms inclusive, hydroxyalkyls of one to four carbon atoms inclusive and

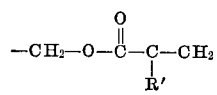

R" is a radical selected from the group consisting of hydrogen, —OH and

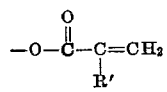

$m$ is an integer equal to at least 1; $p$ is one of the following: 0, 1; and $n$ is an integer equal to at least 1.

18. In the method of producing engagement between the mating surfaces of cooperating parts which are capable of substantially excluding oxygen from at least a portion of the engaged area, the steps comprising: placing upon a portion of the surface of a first part to be engaged a liquid composition anaerobically polymerizable to solid, tough synthetic polymer upon the exclusion of oxygen; and forming an envelope of an oxygen-permeable material about said anaerobically polymerizable liquid composition to provide a substantially nontacky outer surface for said coating, said envelope being rupturable upon assembly of said part with a cooperating part to release said liquid composition.

19. The method of claim 18 wherein said anaerobically polymerizable composition consists essentially of a hydroperoxide catalyst and a polymerizable polyacrylate ester having the following general formula:

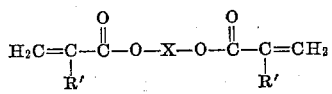

wherein R' is a member selected from the class consisting of hydrogen, halogen and lower alkyl groups of one to four carbon atoms; and wherein X is a chain containing at least two carbon atoms and containing no groups which would tend to polymerize other than acrylate groups.

20. The method of claim 19 wherein [X—O—] corresponds to the following general formula:

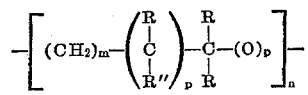

wherein R represents a radical selected from the group consisting of hydrogen, lower alkyls of one to four carbon atoms inclusive, hydroxyalkyls of one to four carbon atoms inclusive and

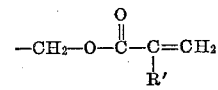

R" is a radical selected from the group consisting of hydrogen, —OH and

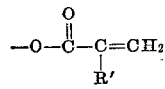

$m$ is an integer equal to at least 1; $p$ is one of the following: 0, 1; and $n$ is an integer equal to at least 1.

21. The method of claim 18 wherein said envelope is produced by exposing the anaerobically polymerizable composition to an activating material which produces localized polymerization at the surface of said composition to form a skin therefrom.

22. The method of claim 21 wherein said activating material is sulfur dioxide.

References Cited

UNITED STATES PATENTS

| | | | |
|---|---|---|---|
| 2,800,457 | 7/1957 | Green et al. | 252—316 |
| 2,895,950 | 7/1959 | Krieble | 156—305 |
| 3,293,977 | 12/1966 | Dalton et al. | 85—37 |
| 3,169,079 | 2/1965 | Ferington et al. | 117—62.2 |
| 3,249,656 | 3/1966 | Kalinowski | 260—86.1 |

OTHER REFERENCES

Del Monte et al.: The Technology of Adhesives, Reinhold, New York (1947), pp. 322 and 323 relied on.

Randolph et al.: Plastics Engineering Handbook, Reinhold, New York (1960), p. 495 relied on.

Simonds et al.: A Concise Guide to Plastics, Reinhold, New York (1963), p. 51 relied on.

W. E. HOAG, Assistant Examiner

U.S. Cl. X.R.

117—161; 151—14.5; 161—216

UNITED STATES PATENT OFFICE
CERTIFICATE OF CORRECTION

Patent No. 3,489,599      Dated January 13, 1970

Inventor(s) Vernon K. Krieble, Deceased

It is certified that error appears in the above-identified patent and that said Letters Patent are hereby corrected as shown below:

At Column 10, lines 48-52, the formula should read as follows:

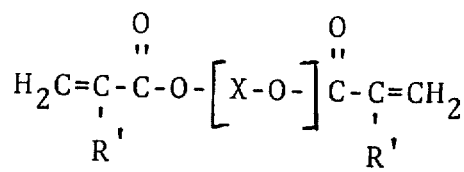

At Column 10, line 59, "X" should read --$\left[ X\text{-}O\text{-} \right]$--.

At Column 11, lines 26-29, the formula should read as follows:

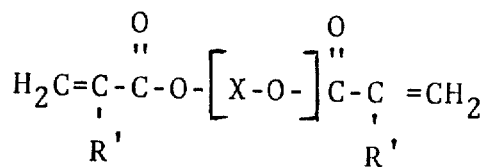

Signed and sealed this 24th day of August 1971.

(SEAL)
Attest:

EDWARD M. FLETCHER, JR.      WILLIAM E. SCHUYLER, JR.
Attesting Officer      Commissioner of Patents